United States Patent
Cho et al.

(10) Patent No.: US 7,331,679 B2
(45) Date of Patent: Feb. 19, 2008

(54) REFLECTION UNIT HAVING A MIRROR ARRAY, AND PROJECTION DISPLAY SYSTEM EMPLOYING THE SAME

(75) Inventors: Kun-ho Cho, Suwon-si (KR); Alexei Borodouline, Suwon-si (KR); Ji-whan Noh, Suwon-si (KR); Kirill Sokolov, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 11/119,803

(22) Filed: May 3, 2005

(65) Prior Publication Data
US 2005/0286025 A1    Dec. 29, 2005

(30) Foreign Application Priority Data
Jun. 28, 2004    (KR) ............... 10-2004-0048933

(51) Int. Cl.
G03B 21/60 (2006.01)
G03B 21/28 (2006.01)
G03B 21/00 (2006.01)
G03B 21/56 (2006.01)

(52) U.S. Cl. .......... 353/78; 353/99; 353/121; 359/457; 359/460

(58) Field of Classification Search .......... 353/69, 353/70, 74, 77, 78, 99, 121; 359/457, 460
See application file for complete search history.

(56) References Cited

U.S. PATENT DOCUMENTS 5,590,942 A * 1/1997 Kimura et al. ............. 353/34
6,631,994 B2 * 10/2003 Suzuki et al. ............. 353/77
7,027,222 B2 * 4/2006 Takahashi et al. ......... 359/463
7,163,297 B2 * 1/2007 Suzuki et al. ............. 353/77
2002/0181099 A1   12/2002 Lin et al.
2003/0072077 A1    4/2003 Peterson et al. .......... 359/460

FOREIGN PATENT DOCUMENTS

| JP | 60-123802 | 7/1985 |
| JP | 01-14087 | 6/1989 |
| JP | 05-188238 | 7/1993 |
| JP | 06-059093 | 3/1994 |
| JP | 09-138349 | 5/1997 |

(Continued)

OTHER PUBLICATIONS

Hungarian Search Report dated Jan. 3, 2006 issued in P0500606.

(Continued)

Primary Examiner—Melissa Jan Koval
(74) Attorney, Agent, or Firm—Stanzione & Kim, LLP (57) ABSTRACT

A projection display system includes a screen, an illumination projecting system to form an image using light radiated by a light source, to magnify the image, and to project the image along a rear side of the screen, and a reflection unit having an array of unit mirrors to reflect the image received from the illumination projecting system onto the screen, each of the unit mirrors having a first sloped reflection surface and a second reflection surface adjacent to the first reflection surface having a predetermined angle therebetween.

27 Claims, 7 Drawing Sheets

FOREIGN PATENT DOCUMENTS

| | | |
|---|---|---|
| JP | 11-206757 | 8/1999 |
| JP | 2001-075173 | 3/2001 |
| JP | 2002-221611 | 8/2002 |
| JP | 2003-005275 | 1/2003 |
| JP | 2003-107397 | 4/2003 |
| KR | 2001-0073285 A | 8/2001 |
| WO | WO2004-049059 | 6/2004 |

OTHER PUBLICATIONS

Korean Office Action dated Feb. 28, 2006 of Korean Patent Application No. 10-2004-0048933.

* cited by examiner

FIG. 1

(PRIOR ART)

REFLECTION UNIT HAVING A MIRROR ARRAY, AND PROJECTION DISPLAY SYSTEM EMPLOYING THE SAME

CROSS-REFERENCE TO RELATED APPLICATIONS

This application claims priority from Korean Patent Application No. 200448933, filed on Jun. 28, 2004, in the Korean Intellectual Property Office, the disclosure of which is incorporated herein in its entirety by reference.

BACKGROUND OF THE INVENTION

1. Field of the Invention

The present general inventive concept relates to a reflection unit having a mirror array and a projection display system employing the same, and more particularly, to a reflection unit and a projection display system in which a mirror array is provided to maximize a reflection region of a beam reflected from the mirror array toward a screen, thereby achieving a reduced depth dimension for the projection display system.

2. Description of the Related Art

In a projection display system, a display element controls light exiting from a lamp light source to form a color image having a plurality of pixels, and the color image is magnified and projected to a screen. Recently, demand has increased for projection display systems having a reduced depth dimension (i.e., reduced thickness) and a large screen. Accordingly, various projection display systems have been developed.

In order to reduce the depth dimension of the projection display system, a depth dimension of a square pendulum of a beam bundle from a projection optical system should be reduced. However, if the projection optical system is disposed at a center of the screen, reduction of the depth dimension of the square pendulum of the beam bundle from the projection optical system is limited. Accordingly, in order to reduce the depth dimension of the square pendulum, the projection optical system is disposed at an angle at a bottom side of the screen.

In addition, various other technologies are being developed in an attempt to increase the size of the color image projected on the screen while reducing the depth dimension of the projection display system. However, there is a difficulty in reducing the depth dimension, since the screen is large and a. That is, there is a trend in which the entire projection optical system is increased in size in order to increase the size of the screen. However, there is a technological difficulty in reducing the size of the entire projection optical system while reducing the depth dimension of the projection display system.

Further, the projection optical system is disposed at an angle at the bottom side of the screen, and a beam exiting the projection optical system is reflected by a reflection mirror to propagate toward the screen. Since the projection display system has a compact depth, the beam exiting the projection optical system should have a large spreading angle.

Figure 1:
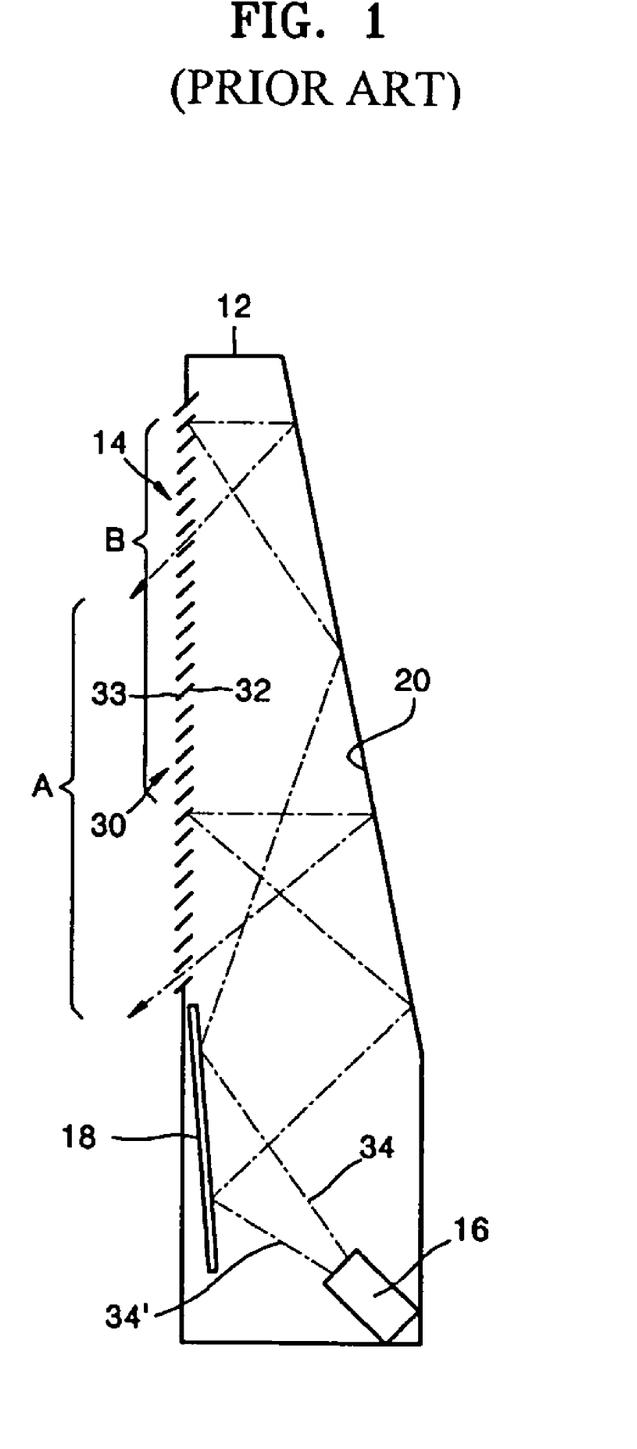
FIG. 1 is a view illustrating a conventional rear projection display system.

A projection display system is disclosed in U.S. Patent Application Publication No. 2003/0072077. Referring to FIG. 1, the projection display system includes a cabinet 12 and a screen 14. The cabinet 12 includes an image source 16 for forming a color image, a first reflection mirror 18 for reflecting images 34 and 34' from the image source 16, and a second reflection mirror 20 for reflecting the image (i.e., the images 34 and 34') received from the reflection mirror 18 toward the screen 14.

The screen 14 includes a reflection element 30 arranged in a vertical direction. The reflection element 30 has a reflection surface 32 disposed to slant downward and toward an inside of the cabinet 12.

An image path in the projection display system of FIG. 1 is now described.

An image produced by the image source 16 is primarily reflected from the first reflection mirror 18 to be incident on the second reflection mirror 20. The image is then reflected from the second reflection mirror 20 to the reflection element 30 of the screen 14. The reflection element 30 includes the reflection surface 32 and a rear surface 33. The reflection element 30 then reflects a first part of the image back to the second reflection mirror 20, and transmits a second part of the image through the reflection element 30 of the screen 14.

The projection display system of FIG. 1 has a disadvantage in that a contrast deteriorates as a result of the image being reflected twice from the second reflection surface 20 to be incident twice on the screen 14.

Further, since the second reflection mirror 20 is a plane mirror, an effective image region (A) on which the image is incident on the screen 14 is small. Since the effective image region (A) is different from a region (B) at which the image is primarily reflected on the second reflection mirror 20, there is a disadvantage in that an effective screen size is reduced compared to an actual screen size.

SUMMARY OF THE INVENTION

The present general inventive concept provides a reflection unit and a projection display system employing the same in which a mirror array is provided to maximize an effective image region of a beam reflected onto a screen, thereby reducing a depth dimension of the projection display system.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a projection display system including: a screen, an illumination projecting system to form an image using light radiated from a light source, to magnify the image, and to project the image along a rear side of the screen, and a reflection unit having an array of unit mirrors to reflect the image received from the illumination projecting system onto the screen, each of the unit mirrors having a first sloped reflection surface and a second reflection surface adjacent to the first reflection surface having a predetermined angle therebetween.

The unit mirrors may be arranged in parallel.

The unit mirrors may be arranged to have a predetermined curvature. The unit mirrors can have a curvature center positioned inside the reflection unit. Alternatively, the unit mirrors can have a curvature center positioned outside the reflection unit.

The unit mirrors may have first reflection surfaces having slopes that vary with respect to a height direction of the screen. The slopes of the first reflection surfaces may gradually increase as a height thereof is increased along the height direction of the screen.

The reflection unit may have a tooth-shaped section. The unit mirrors of the array of unit mirrors may have a pitch within a range of 50 um to 1000 um.

The foregoing and/or other aspects and advantages of the present general inventive concept may also be achieved by providing a reflection unit usable with a projection display system including an array of unit mirrors to reflect an image from an illumination projecting system onto a screen, wherein the unit mirrors have a first sloped reflection surface and a second reflection surface adjacent to the first reflection surface having a predetermined angle therebetween.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
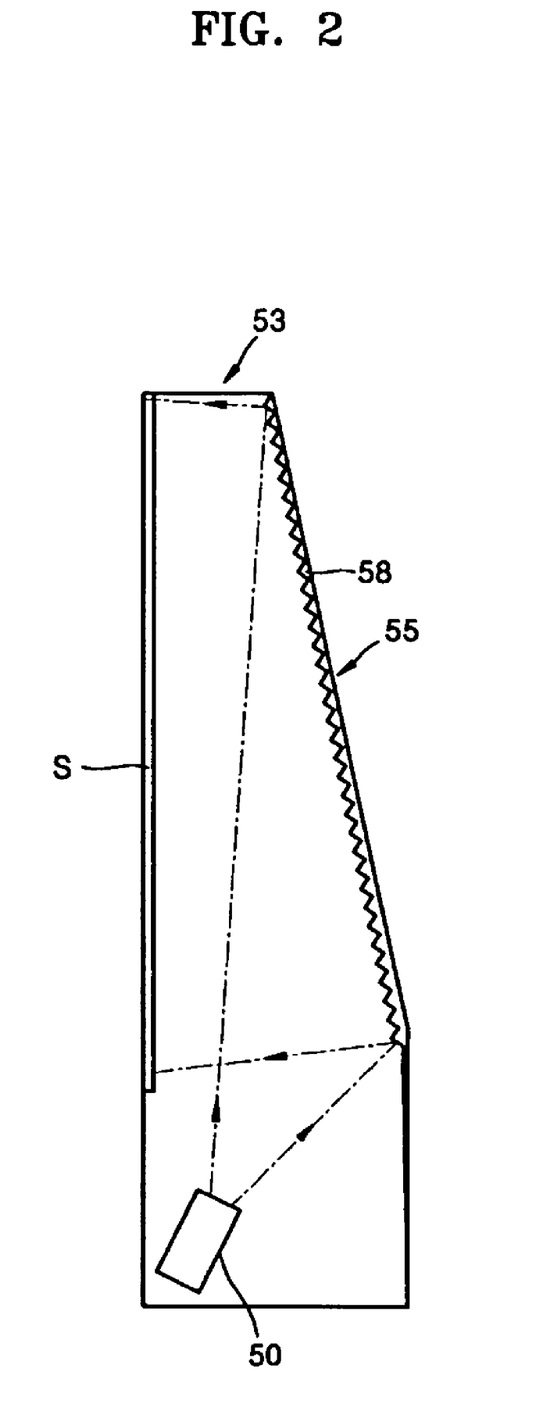
FIG. 2 is a schematic view illustrating a projection display system according to an embodiment of the present general inventive concept.

FIG. 2 is a schematic view illustrating a projection display system according to an embodiment of the present general inventive concept.

Referring to FIG. 2, the projection display system includes an illumination projecting system 50 to form an image, to magnify the image, and to project the image, and a cabinet 53 including a screen (S).

The illumination projecting system 50 includes a light source to radiate light. The illumination projecting system 50 magnifies and projects the image, which is formed in a display device, such as a cathode ray tube (CRT), a digital lighting processor (DLP), or a Liquid Crystal Display (LCD), through a projection lens unit using the light radiated by the light source.

Figure 3:
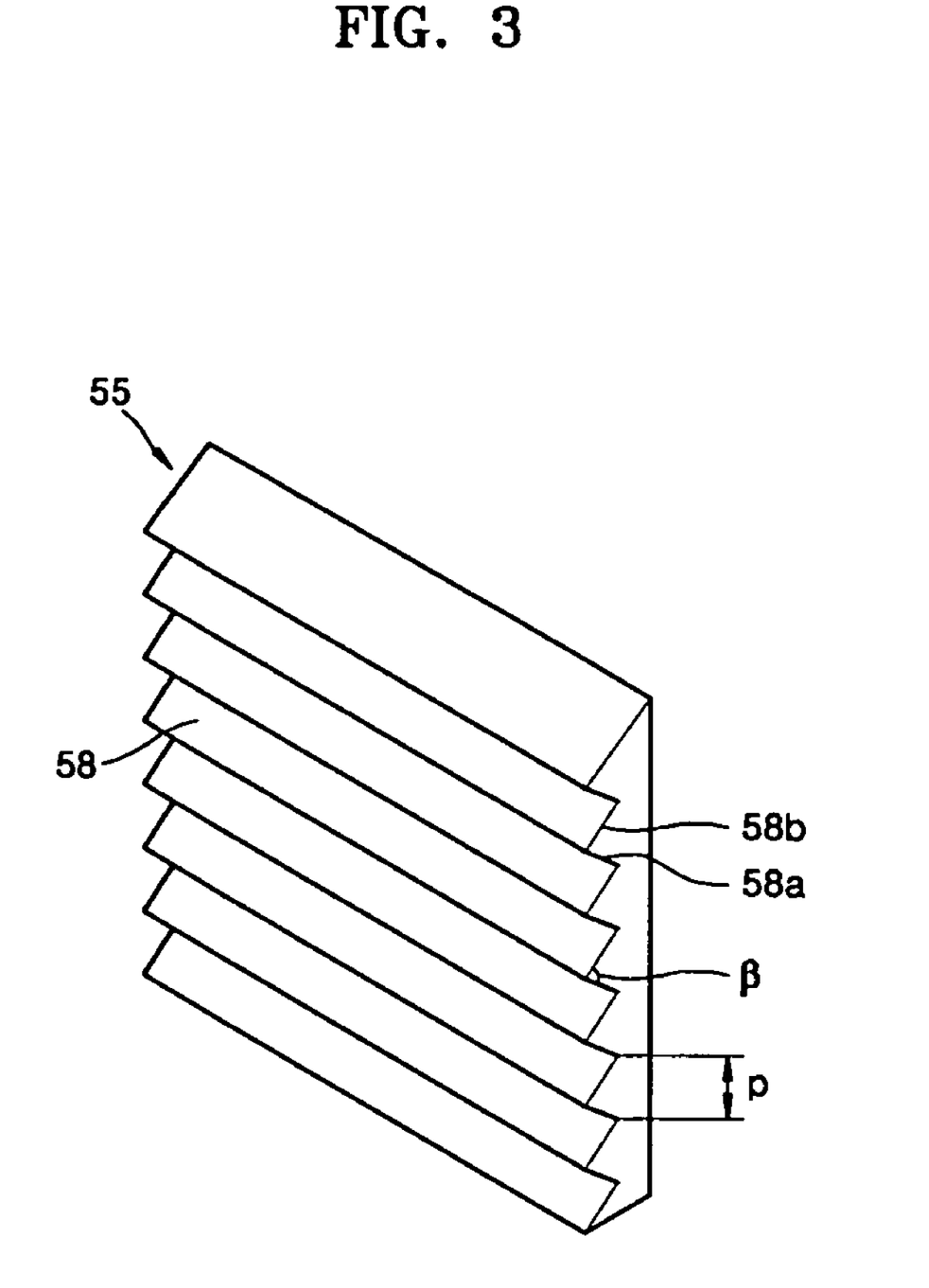
FIG. 3 is a view illustrating a mirror array included in a projection display system according to an embodiment of the present general inventive concept.

A reflection unit 55 is provided at a rear side of the screen (S) to reflect the image received from the illumination projecting system 50 toward the screen (S). A plurality of unit mirrors 58 are arranged in an array to form the reflection unit 55. As illustrated in FIG. 3, each of the plurality of unit mirrors 58 includes a first reflection surface 58a and a second reflection surface 58b. The first reflection surface 58a reflects a beam incident from the illumination projecting system 50 toward the screen (S). The second reflection surface 58b is adjacent to the first reflection surface 58a having a predetermined angle β disposed therebetween. The plurality of unit mirrors 58 make the reflection unit 55 have a tooth-shaped section.

Figure 4A:
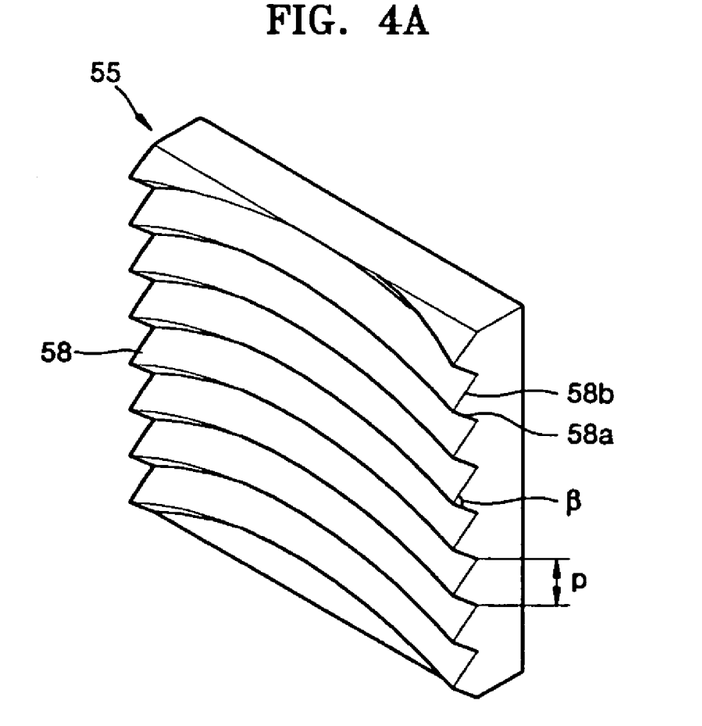
FIG. 4A is a view illustrating a mirror array included in a projection display system according to another embodiment of the present general inventive concept.
Figure 4B:
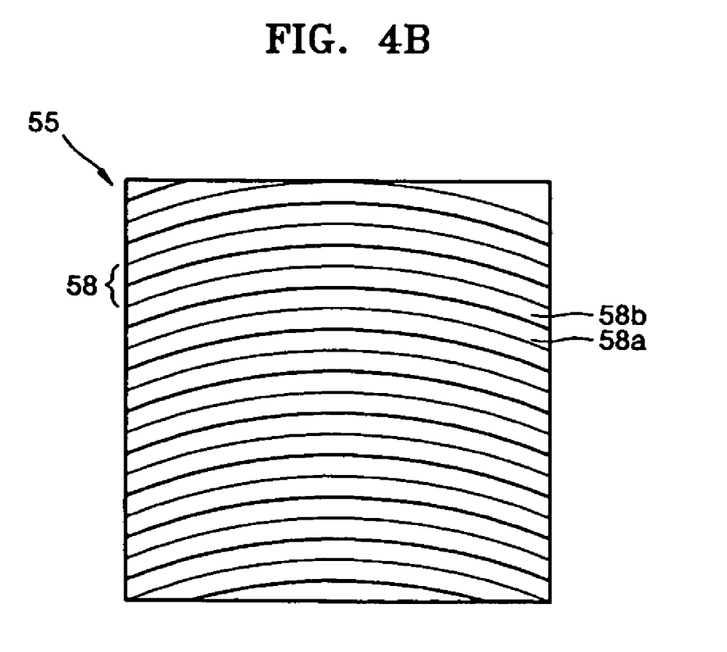
FIG. 4B is a front view illustrating the mirror array of FIG. 4A.

As illustrated in FIG. 3, the reflection unit 55 can have a structure in which the plurality of unit mirrors 58 are arranged in straight lines and in parallel having a pitch (p). Alternatively, as illustrated in FIG. 4A, the reflection unit 55 can have a structure in which the plurality of unit mirrors 58 are arranged with a predetermined curvature. The predetermined curvature may have a curvature center positioned outside of the reflection unit 55 or inside of the reflection unit 55. FIG. 4B illustrates a case in which the curvature center is positioned outside of the reflection unit 55.

Figure 4C:
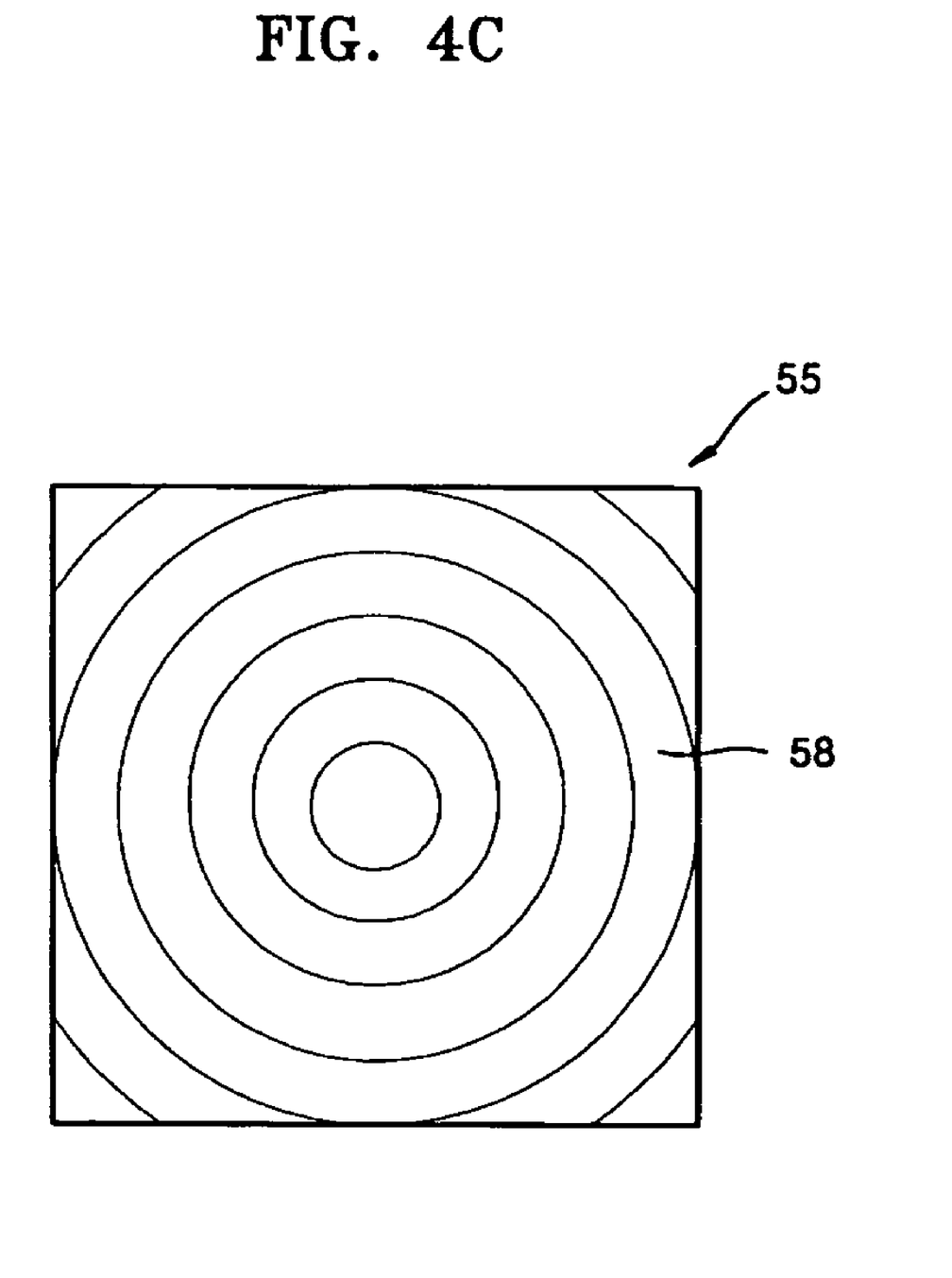
FIG. 4C is a view illustrating a mirror array included in a projection display system according to another embodiment of the present general inventive concept.

Further, FIG. 4C illustrates a case in which the curvature center is positioned inside of the reflection unit 55. Alternatively, in the case where the curvature center is positioned inside of the reflection unit 55, the plurality of unit mirrors 58 can be arranged symmetrically or asymmetrically. For example, as illustrated in FIG. 4C, the plurality of unit mirrors 58 can be arranged concentrically.

Referring back to FIG. 2, the reflection unit 55 has a mirror array structure forming a tooth-shaped section.

Figure 5:
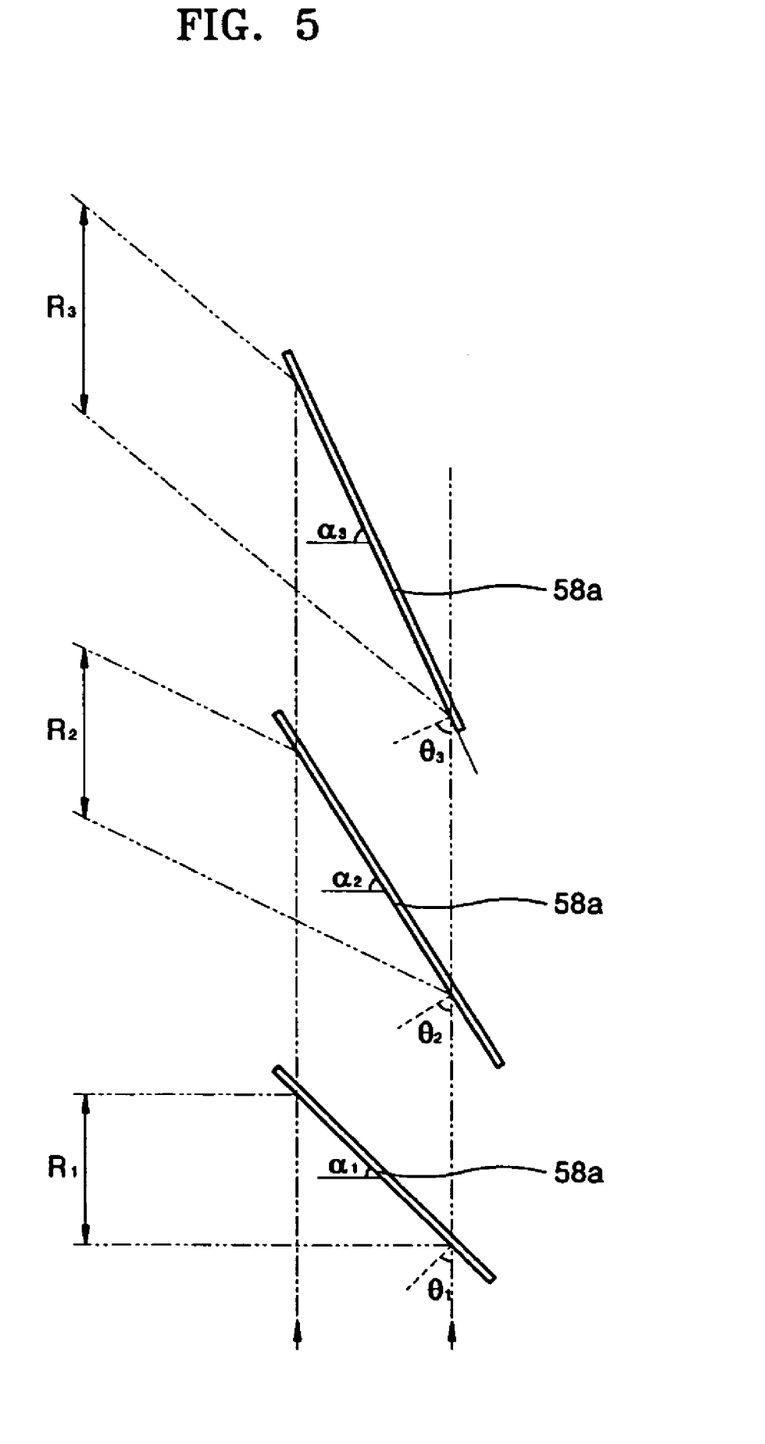
FIG. 5 is a view illustrating a reflection unit having a plurality of unit mirrors having varying slopes according to the present general inventive concept.

FIG. 5 illustrates first reflection surfaces 58a of the plurality of unit mirrors 58 having corresponding slopes. FIG. 5 illustrates a comparison of reflection regions of the beams reflected by each of the first reflection surfaces 58a according to the corresponding slopes. When the corresponding slopes of the first reflection surfaces 58a are different from one another and incident beams are received from the same direction, the reflection regions of the reflected beams are different from one another.

As illustrated in FIG. 5, a relationship of angles of the incident beams is given by $\theta_1 < \theta_2 < \theta_3$ depending on the corresponding slopes $\alpha_1$, $\alpha_2$, and $\alpha_3$ of the first reflection surface 58a. At this time, when the reflection regions of the reflected beams are respectively given by $R_1$, $R_2$, and $R_3$, their relationship is given by $R_1 < R_2 < R_3$. As described above, the reflection regions of the reflected beams depend on the angles of the incident beams and the corresponding slopes of the first reflection surfaces 58a. Accordingly, a total reflection region may be maximized when the image from the illumination projecting system 50 is reflected from the reflection unit 55.

When widths of the reflection regions are given by $R_1$, $R_2$, and $R_3$, the widths of the reflection regions have the same ratio as the corresponding incident angles. That is, $R_2/R_1 = \sin\theta_2/\sin\theta_1$ and $R_3/R_2 = \sin\theta_3/\sin\theta_2$.

Figure 6:
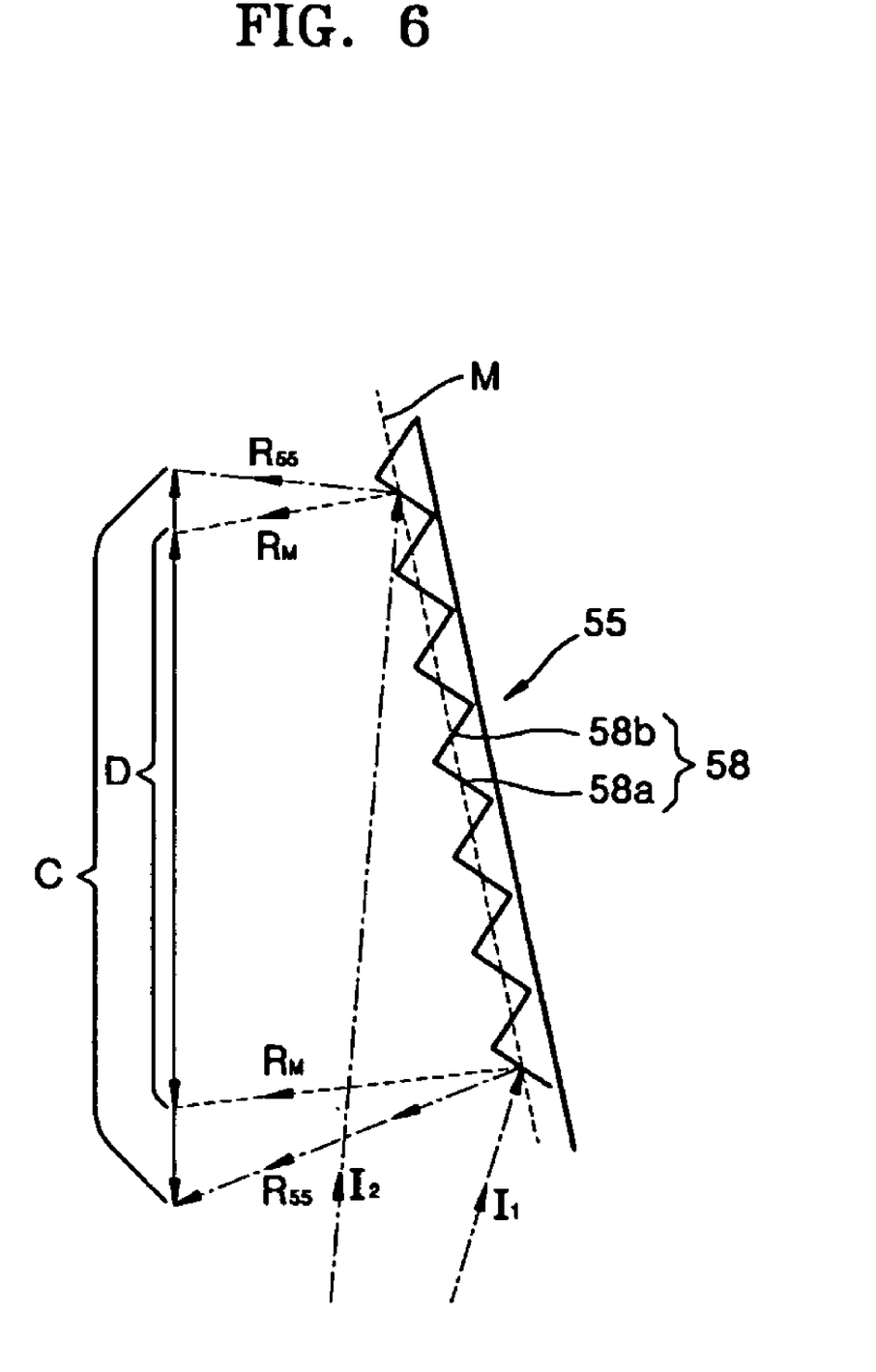
FIG. 6 is a view illustrating a reflection region of a beam reflected from a reflection unit according to the present general inventive concept with compared to a reflection region of a beam reflected from a plane mirror.

FIG. 6 illustrates a comparison between the reflection regions when images ($I_1$) and ($I_2$) that exit from the illumination projecting system 50 (see FIG. 2) are incident on the reflection unit 55 and when the images ($I_1$) and ($I_2$) are incident on a plane mirror (M) positioned along where the reflection unit 55 is positioned.

Assuming that a region of an image ($R_{55}$) reflected by the reflection unit 55 is "C," and a region of an image ($R_M$) reflected by the plane mirror (M) is "D," the slopes of the first reflection surfaces 58a of the plurality of unit mirrors 58 are selected to satisfy a relationship C>D. Since the region of the image ($R_{55}$) is larger than the region of the image ($R_M$), a length of the reflection unit 55 in a direction along a line parallel to the screen (S) may be shorter than the length of the screen (S).

In particular, the image ($I_1$) incident on a lower part of the reflection unit 55 is reflected toward a lower part of the screen (S) (see FIG. 2), and the image ($I_2$) incident on an upper part of the reflection unit 55 is reflected toward an upper part of the screen (S). In order to reflect the image ($I_1$) incident on the reflection unit 55 toward the lower part of the screen (S), the slope of the first reflection surface 58a is small. In order to reflect the image ($I_2$) incident on the reflection unit 55 toward the upper part of the screen (S), the slope of the first reflection surface 58a is large. A large slope has a larger vertical component than a horizontal component, and a small slope has a larger horizontal component than a vertical component. As illustrated in FIG. 5, as the slopes $\alpha_1$, $\alpha_2$, and $\alpha_3$ of the first reflection surfaces 58a are increased, the images ($I_1$) and ($I_2$) are reflected toward the upper part of the screen (S). Conversely, as the slopes $\alpha_1$, $\alpha_2$, and $\alpha_3$ of the first reflection surfaces 58a are decreased, the images ($I_1$) and ($I_2$) are reflected toward the lower part of the screen (S).

Accordingly, the slopes $\alpha_1$, $\alpha_2$, and $\alpha_3$ of the first reflection surfaces 58a of the reflection unit 55 can be varied along a height direction of the screen (S). The slopes $\alpha_1$, $\alpha_2$, and $\alpha_3$ of the first reflection surfaces 58a may be gradually increased as the height thereof increases along the height direction of the screen (S). A majority of the images radiated from the illumination projecting system 50 are reflected from the first reflection surfaces 58a to propagate toward the screen (S), and beams reflected from the screen (S) or incident in other directions are reflected from second reflection surfaces 58b to propagate toward the screen (S).

With reference to FIG. 3, the plurality of unit mirrors may have a pitch (p) within a range of 50 um (micrometers) to 1000 um. If the pitch is too small, however, interference between reflected beams can result. On the other hand, if the pitch (p) is too large, a non-reflection region is formed on the screen (S) at which no beams of the image are reflected, thereby deteriorating a picture quality.

The image that exits from the illumination projecting system is projected to the screen (S) such that a wide reflection region is provided when the image is reflected from the reflection unit 55.

As described above, the projection display system of the present general inventive concept has an advantage in that a reflection unit having a mirror array widens a reflection region of an image formed by an illumination projecting system. A slope of the reflection surface of the reflection unit is selected in order to allow the projection display system to have a compact depth while providing a maximum-sized reflection region.

Further, each of the slopes of the reflection surfaces is varied to have an optimal slope along the height direction of the screen, thereby improving the picture quality. Furthermore, the image formed by the illumination projecting system is reflected once by the reflection unit to the screen, thereby preventing the picture quality from being deteriorated due to interference between the beams.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A projection display system, comprising:
   a screen;
   an illumination projecting system to form an image using light radiated by a light source, to magnify the image, and to project the image along a rear side of the screen; and
   a reflection unit having an array of a plurality of unit mirrors disposed on a plane to reflect the image received from the illumination projecting system to the screen, each of the unit mirrors having a first sloped reflection surface having a first angle with respect to the plane and a second reflection surface disposed between the first reflection surface and another first reflection surface of an adjacent unit mirror to form a predetermined angle therebetween, and having a second angle with respect to the plane.

2. The system of claim 1, wherein the unit mirrors of the array of unit mirrors are arranged in parallel.

3. The system of claim 1, wherein the array of unit mirrors is arranged to have a predetermined curvature.

4. The system of claim 3, wherein the array of unit mirrors has a curvature center positioned inside the reflection unit.

5. The system of claim 3, wherein the array of unit mirrors has a curvature center positioned outside the reflection unit.

6. The system of claim 2, wherein the unit mirrors of the array of unit mirrors have first reflection surfaces having slopes that vary with respect to a height direction of the screen.

7. The system of claim 6, wherein the slopes of the first reflection surfaces gradually increase as a height thereof is increased along the height direction of the screen.

8. The system of claim 1, wherein the reflection unit has a tooth-shaped section.

9. The system of claim 1, wherein the unit mirrors of the array of unit mirrors have a pitch within a range of 50 um to 1000 um.

10. A projection display system, comprising:
    a housing;
    a screen disposed at a first surface of the housing;
    an image creation unit disposed at a side of the housing to create an image and project the image; and
    a reflection unit disposed at a second surface of the housing and having a plurality of first sloped reflection surfaces disposed on a pliane corresponding to the second surface of the housing to receive beams of the image at an angle with respect to the plane and to reflect the corresponding ones of the received beams of the image toward the screen at a second angle with respect to the plane.

11. The system of claim 10, wherein the plurality of sloped reflection surfaces are spaced apart from each other.

12. The system of claim 10, wherein the plurality of first sloped reflection surfaces form different angles with respect to the second surface of the housing.

13. The system of claim 10, wherein the reflection unit comprises a plurality of second sloped reflection surfaces disposed between adjacent first sloped reflection surfaces.

14. A reflection unit usable with a projection display system, comprising:
    an array of unit mirrors to reflect an image received from an illumination projecting system onto a screen at an angle with respect to a plane, wherein the unit mirrors each have a first sloped reflection surface having a first angle with respect to the plane and a second reflection surface adjacent to disposed between the first reflection surface and another first reflection surface of an adjacent unit mirror to form a predetermined angle therebetween, and having a second angle with respect to the plane.

15. The reflection unit of claim 14, wherein the unit mirrors of the array of unit mirrors are arranged in parallel.

16. The reflection unit of claim 14, wherein the unit mirrors of the array of unit mirrors are arranged to have a predetermined curvature.

17. The reflection unit of claim 16, wherein the array of unit mirrors has a curvature center positioned inside of the reflection unit.

18. The reflection unit of claim 16, wherein the array of unit mirrors has a curvature center positioned outside the reflection unit.

19. The reflection unit of claim 16, wherein unit mirrors of the array of unit mirrors have first reflection surfaces having slopes that vary with respect to a height direction of the screen.

20. The reflection unit of claim 19, wherein the slopes of the first reflection surfaces gradually increase as a height thereof increases along the height direction of the screen.

21. The reflection unit of claim 15, wherein unit mirrors of the array of unit mirrors have first reflection surfaces having slopes that vary with respect to a height direction of the screen.

22. The reflection unit of claim 15, wherein the reflection unit has a tooth-shaped section.

23. The reflection unit of claim 14, wherein the unit mirrors of the array of unit mirrors have a pitch within a range of 50 um to 1000 um.

24. The reflection unit of claim 14, wherein the reflection unit has a tooth-shaped section.

25. A method of an image projection system, the method comprising:
producing an image;
projecting the image along a rear side of a screen; and
individually reflecting beams of the projected image at different angles onto the screen using a reflection unit having a plurality of first sloped reflection surfaces disposed on a plane corresponding to the second surface of the housing to receive beams of the image at an angle with respect to the plane and to reflect the corresponding ones of the received beams of the image toward the screen at a second angle with respect to the plane.

26. The method of claim 25, wherein the reflecting of the beams of the image comprises:
receiving the projected image onto a reflection unit;
reflecting beams received near a bottom of the reflection unit toward a bottom of the screen; and
reflecting beams received near a top of the reflection unit toward a top of the screen.

27. A projection display system, comprising:
a housing;
a screen disposed at a first surface of the housing;
an image creation unit disposed at a side of the housing to generate first, second, and third beams corresponding to first, second, and third images to form a full image; and
a reflection unit disposed at a second surface of the housing and having first, second, and third sloped reflection surfaces disposed on a plane corresponding to the second surface of the housing to have an angle with the plane to respectively receive the first, second, and third beams from the image creation unit at first, second, and third angles, respectively, with respect to the plane, and to reflect the corresponding ones of the received first, second, and third beams toward the screen at first sub, second sub, and third sub angles with respect to the plane, to form the full image on the screen.

* * * * *